(12) United States Patent
Yoon et al.

(10) Patent No.: US 6,630,196 B1
(45) Date of Patent: *Oct. 7, 2003

(54) IMAGE DISPLAY FACEPLATE ON WHICH CONDUCTIVE ORGANIC POLYMERIC TRANSPARENT ANTI-STATIC FILM IS FORMED, ITS SOLUTION AND ITS MANUFACTURING METHOD

(75) Inventors: Sang Youl Yoon, Kyungsangbuk-do (KR); Chang Han Lee, Kyungsangbuk-do (KR); Ho Seok Shon, Kyungsangbuk-do (KR)

(73) Assignee: Orion Electric Co., Ltd., Kyungsangbuk-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/743,622

(22) PCT Filed: Jul. 22, 1999

(86) PCT No.: PCT/KR99/00393

§ 371 (c)(1),
(2), (4) Date: Jan. 12, 2001

(87) PCT Pub. No.: WO00/05625

PCT Pub. Date: Feb. 3, 2000

(30) Foreign Application Priority Data

Jul. 24, 1998 (KR) ......................................... 1998-29792
May 19, 1999 (KR) ......................................... 1999-18149

(51) Int. Cl.⁷ .............................. B05D 5/12; H01J 29/86
(52) U.S. Cl. ................. 427/64; 252/519.3; 252/519.31; 252/519.33; 427/68; 524/588; 524/767; 524/837; 524/910; 524/911

(58) Field of Search .......................... 252/519.3, 519.31, 252/519.33; 524/588, 767, 837, 910, 911; 427/64, 68; 428/411.1, 428, 429, 447, 448, 922; 313/478, 479, 112, 313, 635; 359/614, 885; 348/820, 834

(56) References Cited

U.S. PATENT DOCUMENTS

| 4,945,282 A | * | 7/1990 | Kawamura et al. | ......... 313/479 |
|---|---|---|---|---|
| 5,742,119 A | * | 4/1998 | Aben et al. | ................. 313/479 |
| 5,750,054 A | * | 5/1998 | Cinquina et al. | ........... 252/500 |
| 5,773,150 A | * | 6/1998 | Tong et al. | ................. 428/429 |
| 6,391,227 B1 | * | 5/2002 | Yoon et al. | ................. 252/500 |

* cited by examiner

Primary Examiner—D. S. Nakarani
(74) Attorney, Agent, or Firm—Notaro & Michalos P.C.

(57) ABSTRACT

An image display faceplate and its manufacturing method wherein an electroconductive organic polymeric transparent anti-static film is formed on the image lay faceplate by the steps of obtaining an aqueous solution by solving electroconductive organic polymers in water, applying the solution and heat-treating the applied faceplate panel at a relatively low temperature, and the solution are disclosed. The aqueous solution is prepared by the steps of: dissolving in alcohol an aqueous solution of polyethylene dioxythiophene which polystyrene sulphonate is doped 3 to; first-adding silicon alkoxide to the alcoholic solution; and second-adding pure water and an inorganic acid catalyst for hydrolysis after the first adding step.

5 Claims, 1 Drawing Sheet

IMAGE DISPLAY FACEPLATE ON WHICH CONDUCTIVE ORGANIC POLYMERIC TRANSPARENT ANTI-STATIC FILM IS FORMED, ITS SOLUTION AND ITS MANUFACTURING METHOD

FIELD OF THE INVENTION

The present invention relates to an image display faceplate on which conductive organic polymeric transparent anti-static film is formed, its solution and its manufacturing method, and in detail to an image display faceplate coated by a conductive organic polymeric film having the improved anti-static characteristics, and adaptive to prevent the reflectivity of an ambient light source, on the exterior surface of the faceplate panel, and more particularly to image display faceplate on the exterior surface of which a transparent anti-static film is formed with conductive organic polymers, and to the coating solution and the manufacturing method of coating the faceplate therewith.

Recently, wide use of an anti-explosion type cathode ray tube has made a face cover glass unnecessary in a television receiver, a monitor, etc., for the prevention of electrostatic charge, thereby exposing the front portion of the cathode ray tube and giving electric shock by charged electrical high voltage to a person who comes in contact with the faceplate of the cathode ray tube. Furthermore, dust in air particles, etc., adhere to and accumulate on the charged faceplate of the cathode ray tube, so that the image on the display faceplate is difficult to see.

The cause of electrostatic charge as to the faceplate panel is as follows.

A thin and uniform aluminium film is deposited by vacuum on the phosphor screen structure on the interior surface of the faceplate panel. When a electric power is applied to, a high anode voltage is applied to the aluminium film. Electric charges generate on the exterior surface wall of the panel by electrostatic induction due to the high voltage of the inside aluminium film.

Korean patent publication No. 2713 is prior art for providing anti-static characteristics on an image display faceplate, and describes one such anti-static coating formed by the steps of preparing a slurry by mixing an alcohol solution containing alkoxysilane Si(OR)$_4$ (where R is an alkyl group) and at least one of tin oxide, indium oxide, and antimony oxide, spraying the slurry on the faceplate panel, and heat-treating the sprayed panel at a relatively low temperature.

U.S. Pat. No. 5,750,054, issued to Patrizia Cinquina, Vasto, et al. on May 12, 1998, discloses an anti-static, anti-glare coating for a reflective-transmissive surface wherein the surface is applied onto with a coating solution comprising a thiophene-based, electroconductive polymer and a siliceous material. As the concrete electroconductive polymer, polyethylenedioxythiophene, and as a siliceous material, lithium-stabilized silica sol and tetraethoxysilane are disclosed.

However, the metallic oxide costs too much, thereby making the manufacturing cost very high.

Further, the problem is that while the metallic oxide exists dispersedly in the alcohol solution, deposition problem arises due to cohesion between the particles according the condition of the surroundings, thereby making spots or unevenness.

Accordingly, it is one object of the present invention to provide an image display faceplate and its manufacturing method wherein an electroconductive organic polymeric transparent anti-static film is formed on the image display faceplate by the steps of obtaining an aqueous solution by dissolving electroconductive organic polymers in water, applying the solution and heat-treating the applied faceplate panel and the solution at a relatively low temperature.

SUMMARY OF THE INVENTION

To accomplish the aforementioned purpose, the present invention provides an electroconductive organic polymeric solution for application onto an image display faceplate in order to form an electroconductive, anti-static film on its exterior surface, said solution being prepared by the steps of: dissolving in alcohol an aqueous solution of polyethylene dioxythiophene doped with polystyrene sulphonate, then adding silicon alkoxide to the alcoholic solution, and finally adding pure water and an inorganic acid catalyst for hydrolysis.

Polystyrene sulphonate, sometimes referred to as polystyrene sulfonate, is an alkyl salt manufactured by sulfonating a polystyrene (e.g., adding SO$_3$H to a polystyrene) and then neutralizing the resulting compound. Polystyrene sulphonate is shown below:

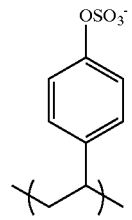

Polystyrene sulphonate is represented by the chemical formula [—CH$_2$CH (C$_6$H$_4$SO$_3$HO—].

Also, the present invention provides an image display a faceplate on which conductive organic polymeric transparent anti-static film is formed on the exterior surface, said film being formed by dissolving in alcohol an aqueous solution of polyethylene dioxythiophene doped with polystyrene sulphonate, then adding silicon alkoxide to the alcoholic solution, then adding pure water and an inorganic acid catalyst for hydrolysis, and applying the resultant electroconductive organic polymeric solution onto the faceplate.

In a method of manufacturing the image display faceplate, on its exterior surface of which an electroconductive, anti-static film is formed, the method comprises the steps of applying the electroconductive organic polymeric solution onto the exterior surface of the faceplate by means of one or the combination of spin-coating spraying and dipping, and heat-treating the applied faceplate at a relatively low temperature between 150 and 180 degrees centigrade.

It is preferred that the electroconductive organic polymeric solution contains polyethylene dioxythiophene of 0.01 to 0.65 wt. % as a solid portion, doped with polystyrene sulphonate, 40 to 90 wt. % of at least one of alcohol in which the number of carbon atoms is between 1 to 10, and silicon alkoxide of 1 to 10 wt. %.

DETAILED DESCRIPTION OF THE PREFERRED EMBODIMENT

Figure 1:
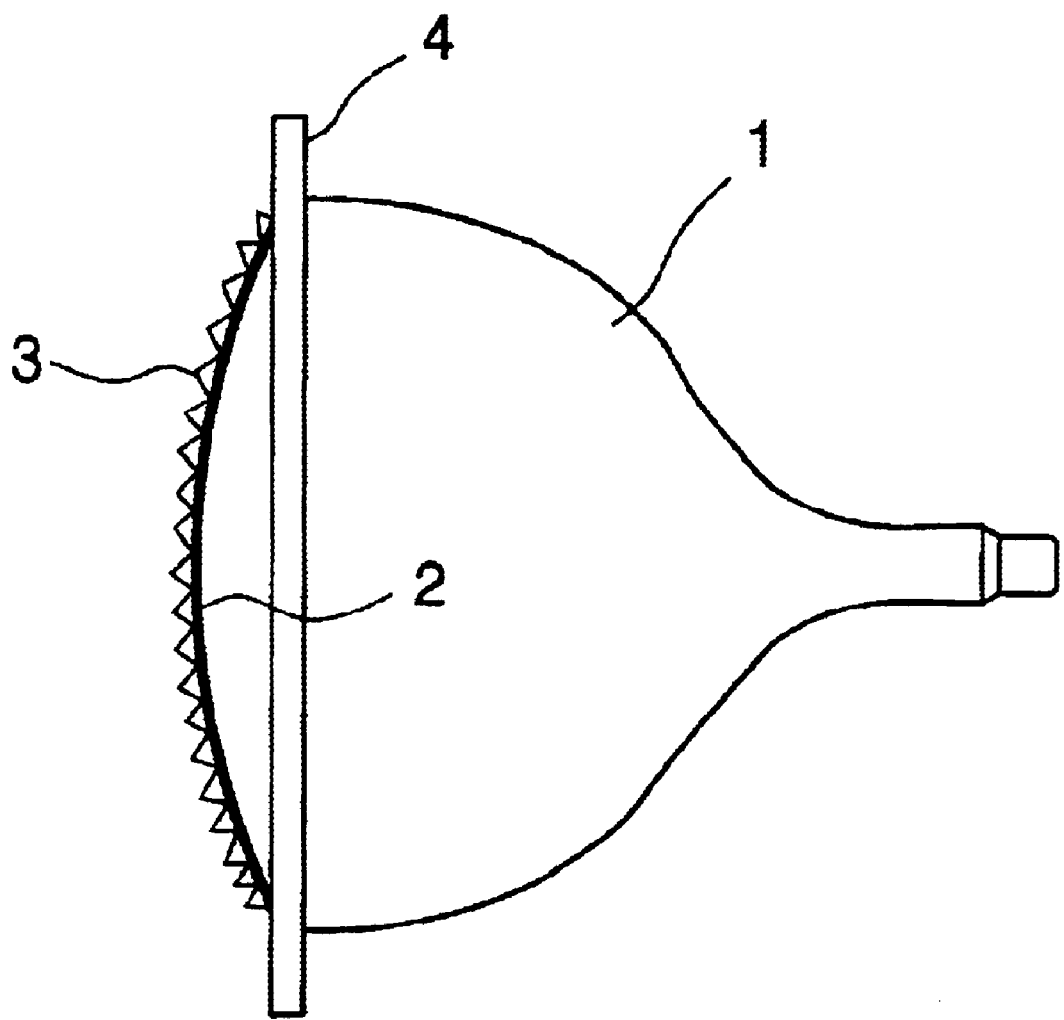
FIG. 1 is a schematical side view partially in axial section of a color cathode-ray tube, wherein an electroconductive organic polymeric transparent anti-static film is formed the exterior surface of a faceplate panel thereof according to the present invention.

In FIG. 1, an electroconductive organic polymeric transparent anti-static film 2 according to the present invention is formed on the exterior surface of a faceplate panel of a color cathode ray tube 1. A grounded anti-explosion band 4 comes into contact with the anti-static film 2 and makes the potential of the overall surface of the anti-static film 2 zero.

The electroconductive organic polymeric transparent anti-static film 2 according to the present invention is formed as follows. An aqueous solution of polyethylene dioxythiophene doped with polystyrene sulphonate is dissolved in alcohol. Subsequently, silicon alkoxide as an adhesive agent is added to the aqueous solution (PEDT/PSS aqueous solution); thereby an electroconductive aqueous solution is prepared. Then, pure water and an inorganic acid catalyst for hydrolysis are added, and thus an electroconductive organic polymeric solution is prepared.

Then, in an upward state of the exterior surface of the faceplate panel of the color cathode ray tube 1, the color cathode ray tube is rotated with around 130 rpm and the prepared solution is dropped on the exterior surface of the faceplate panel, thus the uniform thin anti-static film 2 is formed. This spin-coating is completed for about 1 minute 30 seconds. Following this spin-coating, the anti-static film 2 is dried by heat-treating it at about 80 degrees centigrade. Then, an anti-glare film 3 may be formed by spraying alkoxysilane Si(OR)4 on the anti-static film 2. Last, the films are baked at 180 degrees centigrade for about 30 minutes, thereby the anti-static film 2 and the anti-glare film 3 being completely formed.

As the result of experiments according to the above-described methode, the film hardness and the electroconductivity (surface resistivity) are changed upon the concentration of the PEDT/PSS and, because the surface resistivity becomes increased and the electroconductivity decreased when the solid portion is below 0.01 wt. % in the PEDT/PSS solution, substantial anti-static effect cannot be expected below that concentration of the solid portion. Moreover, because the film hardness becomes decreased and without the increase of the electroconductivity when the solid portion is above 0.65 wt. % in the PEDT/PSS solution, the film formed by means of the PEDT/PSS solution above that concentration of the solid portion cannot be practically used.

The constituents and the results in the experiment examples whithin the scope of the above-defined concentration are hereinafter described specifically.

EXAMPLE 1

This experiment was performed with PEDT/PSS solid content of 0.26%(1.3%*0.2).

| CONSTITUENTS OF THE SOLUTION | CONTENT (W %) |
| --- | --- |
| PEDT/PSS aqueous solution (1.3% in concentration) | 20 wt. % |
| Ethylsilicate | 4 wt. % |
| Ethanol | 65 wt. % |
| Pure water | 6 wt. % |
| 0.1 mol HCl | 5 wt. % |

Result:
1. Surface resistivity: $3.72*10_4$ ohms/sq.
2. Film hardness: 8H

EXAMPLE 2

This experiment was performed with PEDT/PSS solid content of 0.01%(1.3%*0.008).

| CONSTITUENTS OF THE SOLUTION | CONTENT (W %) |
| --- | --- |
| PEDT/PSS aqueous solution (1.3% in concentration) | 0.8 wt. % |
| Ethylsilicate | 4 wt. % |
| Ethanol | 84.2 wt. % |
| Pure water | 6 wt. % |
| 0.1 mol HCl | 5 wt .% |

Result:
1. Surface resistivity: $5.80*108$ ohms/sq. 2. Film hardness: 8H

EXAMPLE 3

This experiment was performed with PEDT/PSS solid content of 0.65%(1.3%*0.5).

| CONSTITUENTS OF THE SOLUTION | CONTENT (W %) |
| --- | --- |
| PEDT/PSS aqueous solution (1.3% in concentration) | 50 wt. % |
| Ethylsilicate | 4 wt. % |
| Ethanol | 35 wt. % |
| Pure water | 6 wt. % |
| 0.1 mol HCl | 5 wt. % |

Result:
1. Surface resistivity: $8.44*10^3$ ohms/sq.
2. Film hardness: 6H

EXAMPLE 4

This experiment was performed with PEDT/PSS solid content: of 0.005%(1.3%*0.004).

| CONSTITUENTS OF THE SOLUTION | CONTENT (W %) |
| --- | --- |
| PEDT/PSS aqueous solution (1.3% in concentration) | 0.4 wt. % |
| Ethylsilicate | 4 wt. % |
| Ethanol | 84.6 wt. % |
| Pure water | 6 wt. % |
| 0.1 mol HCl | 5 wt. % |

Result:
1. Surface resistivity: $1.92*10^{11}$ ohms/sq.
2. Film hardness: 8H

EXAMPLE 5

This experiment was performed with PEDT/PSS solid content of 0.85%(1.3%*0.65).

| CONSTITUENTS OF THE SOLUTION | CONTENT (W %) |
| --- | --- |
| PEDT/PSS aqueous solution (1.3% in concentration) | 65 wt. % |
| Ethylsilicate | 4 wt. % |
| Ethanol | 20 wt. % |

-continued

| CONSTITUENTS OF THE SOLUTION | CONTENT (W %) |
|---|---|
| Pure water | 6 wt. % |
| 0.1 mol HCl | 5 wt. % |

Result:
1. Surface resistivity: $8.63*10^3$ ohms/sq.
2. Film hardness: 4H

According to the result of experiments described above, when the content of the PEDT/PSS is below 0.01 wt. %, the electroconductive becomes remarkably decreased as in the example 4, and when the content of the PEDT/PSS is above 0.65 wt. %, the characteristics of application onto the faceplate become deteriorated due to high viscosity, thereby the film hardness becoming remarkably decreased as in the example 5. Therefore, as in the examples 1 to 3, the content of the PEDT/PSS between 0.1 to 0.65 wt. % is found to be proper as a conductive organic polymeric transparent anti-static film for the image display faceplate.

As in the examples 1 to 3, the electroconductive, transparent anti-static film is formed on the image display faceplate by using the electroconductive organic polymer according to the present invention.

Also, in the examples 1 to 3, a deposition problem was not found, thereby making the coating on the exterior surface of the faceplate even without any spots. The reason is understood to be that the solution used in the present invention does not comprise any inorganic slurry. And, the solution according to the present invention, is found to be easy to store, and excellent in stability as a solution.

It should be clear to one skilled in the art that the present invention can be altered and applied without any limitation to the aforementioned embodiments of the present invention and within the scope of the present invention's spirit.

What is claimed is:

1. A method of manufacturing an image display faceplate, on its exterior surface of which an electroconductive, anti-static film is formed, the method comprising the steps of:

dissolving in alcohol an aqueous solution of polyethylene dioxythiophene doped with polystyrene sulphonate;

first-adding ethylsilicate to the alcoholic solution;

second-adding pure water and an inorganic acid catalyst for hydrolysis after the first adding step; and applying a resultant electroconductive organic polymeric solution in the second-adding step on the faceplate, thereby forming an organic polymeric transparent anti-static film as the electroconductive, anti-static film.

2. A method according to claim 1, wherein the applying step is performed by applying the electroconductive organic polymeric solution onto the exterior surface of the faceplate by means of one or the combination of spin-coating, spraying and dipping, said method further comprising the step of heat-treating the applied faceplate at a relatively low temperature between 150 to 180 degrees centigrade.

3. A method according to claim 1, wherein the electroconductive organic polymeric solution contains polyethylene dioxythiophene of 0.01 to 0.65 wt. % as a solid portion, doped with polystyrene sulphonate; 40 to 90 wt. % of at least one of alcohol in which the number of carbon atoms is between 1 to 10, and ethylsilicate of 1 to 10 wt. %.

4. An electroconductive organic polymeric solution for applying onto an image display faceplate in order to form an electroconductive, anti-static film on its exterior surface, said solution being prepared by the steps of:

dissolving in alcohol an aqueous solution of polyethylene dioxythiophene doped with polystyrene sulphonate;

first-adding ethylsilicate to the alcoholic solution; and second-adding pure water and an inorganic acid catalyst for hydrolysis after the fist adding step.

5. An electroconductive organic polymeric solution according to claim 4, wherein the electroconductive organic polymeric solution contains polyethylene dioxythiophene of 0.01 to 0.65 wt. % as a solid portion, doped with polystyrene sulphonate, 40 to 90 wt. % of at least one of alcohol in which the number of carbon atoms is between 1 to 10, and ethylsilicate of 1 to 10 wt. %.

* * * * *